United States Patent [19]

Jezic

[11] Patent Number: 5,167,899
[45] Date of Patent: Dec. 1, 1992

[54] PROCESS FOR MELT BLOWING MICROFIBERS OF RIGID POLYURETHANE HAVING HARD SEGMENTS

[75] Inventor: Zdravko Jezic, Lake Jackson, Tex.

[73] Assignee: The Dow Chemical Company, Midland, Mich.

[21] Appl. No.: 550,407

[22] Filed: Jul. 10, 1990

[51] Int. Cl.$^5$ .................... D01F 5/098; D04H 3/00
[52] U.S. Cl. .................... 264/510; 156/167; 264/103; 264/210.8; 264/555
[58] Field of Search .................. 264/517, 518, 12, 555, 264/510, 103, 210.8; 156/167

[56] References Cited

U.S. PATENT DOCUMENTS

| | | | |
|---|---|---|---|
| 4,100,324 | 7/1978 | Anderson et al. | 156/167 |
| 4,376,834 | 3/1983 | Goldwasser et al. | 521/159 |
| 4,379,192 | 5/1983 | Wahlquist et al. | 428/156 |
| 4,567,236 | 1/1986 | Goldwasser et al. | 525/127 |
| 4,663,222 | 5/1987 | Ohue et al. | 428/224 |
| 4,767,825 | 8/1988 | Pazos et al. | 525/408 |

*Primary Examiner*—James Lowe

[57] ABSTRACT

Disclosed is a melt-blowing process for producing a fiber of an extrudable polyurethane having a large amount of hard segment, which comprises supplying a polyurethane comprising the reaction product of:
(a) an organic polyisocyanate;
(b) an isocyanate-reactive material having an average functionality of at least 1.9, a glass transition temperature (Tg) of less than 20°C., and a molecular weight in the range of 500 to 20,000; and
(c) at least one chain extender having a functionality from 2 to 3 and a molecular weight from 50 to 400;
which reaction product has up to 25 percent by weight of soft segment derived from the organic polyisocyanate (a) and the isocyanate-reactive material (b) and at least 75 percent by weight of hard segment derived from the organic polyisocyanate (a) and the chain extender (c), in a molten form from at least one orifice of a nozzle into a gas stream supplied to an area adjacent to the orifice which attenuates the molten polymer into fibers. Such microfibers are particularly useful in the field of high temperature filtration, coalescing and insulation.

6 Claims, 1 Drawing Sheet

PROCESS FOR MELT BLOWING MICROFIBERS OF RIGID POLYURETHANE HAVING HARD SEGMENTS

BACKGROUND OF THE INVENTION

This invention relates to microfibers of a extrudable polymers and nonwoven mats prepared therefrom.

The present invention also relates to a melt-blowing process for the production of the microfibers and the nonwoven mats.

Microfibers and nonwoven mats thereof invention are used in many fields where fibers have been used, particularly in the fields of filtration and insulation. The microfibers of the prior art as well as nonwoven mats or webs thereof are produced by a variety of various melt-blowing processes which have been described heretofore in patents and literature.

U.S. Pat. No. 2,411,660 describes a melt-blowing process for the manufacture of nonwoven fabrics from plastics for abrading, scouring, filtering, etc. U.S. Pat. No. 3,849,241 discloses a process for producing a melt-blown nonwoven mat wherein a fiber-forming thermoplastic polymer resin having a specific initial intrinsic viscosity is subjected to degradation in the presence of a free radical source compound. Several melt-blowing processes for the production of a nonwoven thermoplastic fabric or a composite thereof are taught in U.S. Pat. Nos. 4,041,203; 4,100,324; 4,196,245; 4,302,495; 4,379,192; and 4,767,825. R. L. Shambaugh discussed several factors of a melt-blowing process using dimensional analysis in "A Macroscopic View of the Melt-Blowing Process for Producing Microfibers", Ind. Eng. Chem. Res., Vol. 27, No. 12, 2363–72 (1988).

The aforementioned patents indicate that a broad range of plastic materials may be used for producing nonwoven mats of microfibers. U.S. Pat. No. 2,411,660 states that a great variety of plastics may be used, such as vinylidene chloride, polystyrene, polyphenylenesulphide, polyvinyl alcohol, polyvinyl acetate, methyl methacrylate, polymeric amide, copolymer of vinyl chloride and vinyl acetate, latex compositions, cellulosic and petroleum derivatives, protein-base materials, glass, etc. U.S. Pat. Nos. 4,041,203 and 4,100,324 describe that among the many useful thermoplastic polymers, polyolefins such as polypropylene and polyethylene, polyamides, polyesters such as polyethylene terephthalate, and thermoplastic elastomers such as polyurethanes are anticipated to find the most wide spread use in the preparation of the materials described herein (nonwoven thermoplastic fabrics of miorofibers). U.S. Pat. No. 4,379,192 discloses that linear polyethylene, polyisobutylene, polybutadiene, polyurethanes, polyvinyls, polyamides and polyesters, can be used as starting material for microfibers in addition to isotactic polypropylene which is considered as a most preferred material.

U.S. Pat. No. 4,767,825 discloses superabsorbent thermoplastic compositions and melt-blown or spun bonded webs prepared therefrom. The thermoplastic composition comprises from 86 to 98 percent by weight of a poly(oxyethylene)diol soft segment and from 2 to 14 percent by weight of a hard segment which is selected from polyurethanes, polyamides, polyesters, polyureas and mixtures thereof. Unfortunately, these polymers are often either difficult to melt-blow or spin into microfibers or do not have the chemical resistance, toughness and dimensional stability required for many applications.

Therefore, it is desirable to provide a microfiber and a nonwoven mat, fabric, web, or similar structure prepared from a polymer which is easily melt-blown or spun into microfibers exhibiting good chemical resistance excellent toughness and good dimensional stability.

SUMMARY OF THE INVENTION

Surprisingly, in the practice of this invention a rigid, extrudable polyurethane having a large amount of hard segment can be melt-blown to provide an extremely fine, e.g., as thin as 0.5 micron, microfibers having excellent physical and chemical properties. Such extremely fine fibers have not been readily obtained through melt-blowing technique using known thermoplastic elastomers such as polyurethane elastomers having a large amount of soft segment, polypropylene, polystyrene and the like.

According to the present invention there is now provided a melt-blowing process for producing a fiber of a polyurethane having a large amount of hard segment, which comprises supplying an extrudable polyurethane comprising the reaction product of:

(a) an organic polyisocyanate;
(b) an isocyanate-reactive material having an average functionality of at least 1.9, a glass transition temperature TP (Tg) of less than 20° C., and a molecular weight in the range of 500 to 20,000; and
(c) at least one chain extender having a functionality from 2 to 3 and a molecular weight from 50 to 400;

which reaction product has up to 25 percent by weight of soft segment derived from the organic polyisocyanate (a) and the isocyanate-reactive material (b) and at least 75 percent by weight of hard segment derived from the organic polyisocyanate (a) and the chain extender (c), in a molten form from at least one orifice of a nozzle into a gas stream supplied to an area adjacent to the orifice which attenuates the molten polymer into fibers.

Figure 1:
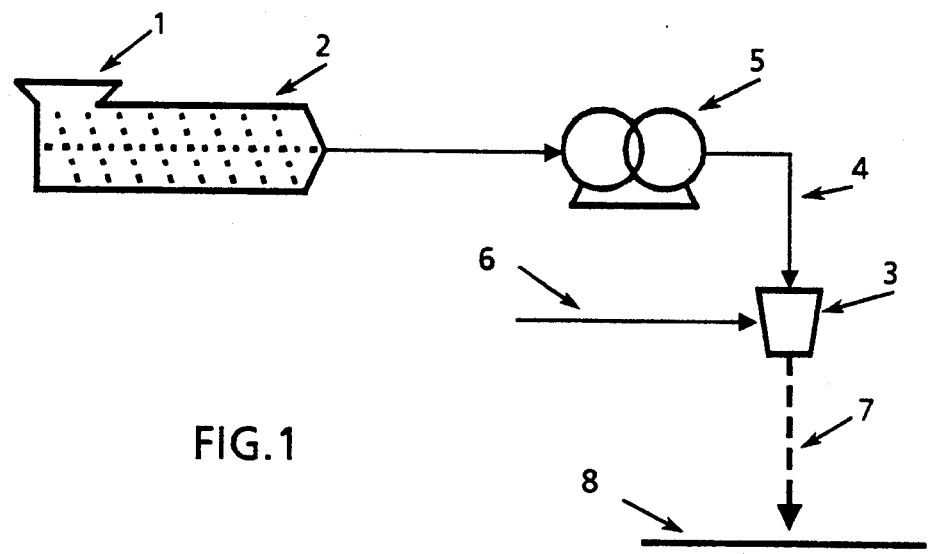
FIG. 1 discloses a schematic diagram of an overall melt-blowing process of a preferred embodiment of the present invention.

Another aspect of the present invention relates to a microfiber of an extrudable polyurethane having a large amount of hard segment, which has an average diameter of not greater than 400 microns, preferably from 0.1 to 50 microns.

A final aspect of the present invention relates to a nonwoven mat or web comprising a random or oriented juxtaposition of a multitude of the foregoing microfibers. Orientation is readily obtained by controlling the laydown of fibers emerging from the spinpack according to known techniques.

It was unexpectedly found that a rigid, extrudable polyurethane having a specific amount of hard segments have excellent microfiber-forming properties such as low viscosity, high melt strength and good melt elasticity when depolymerized at melt temperatures. The depolymerized polyurethane can be readily repolymerized to provide rigid polyurethane having sufficient molecular weight and desired physical and chemical properties such as toughness, chemical resistance and dimensional stability.

The microfibers and the nonwoven mat of the present invention are particularly useful in high temperature filtration of corrosive media such as flue gas, hydraulic oil, and coalescing of fluids under hot and corrosive environments, especially in the presence of acids and bases.

DETAILED DESCRIPTION OF THE INVENTION

As used herein, the term "microfiber" refers to fibers having a diameter smaller than that of melt-spun fibers of the corresponding polymer. The microfibers of the present invention suitably have an average diameter not greater than 400 microns, more suitably from 0.1 to 50 microns, and most suitably from 1 to 10 microns.

As used herein, the term "hard segment" refers to a segment in a resulting polyurethane which is derived from the reaction of the organic polyisocyanate (a) and the chain extender (c).

As used herein, the term "soft segment" refers to a segment in a resulting polyurethane which is derived from the reaction of the organic polyisocyanate (a) and the isocyanate-reactive material (b).

Any known melt-blowing process may be used in the present invention. For example, melt-blowing processes which can be used in the present invention are well described in U.S. Pat. Nos. 3,849,241; 4,041,203; 4,196,245; and 4,302,495, the teachings of which are herein incorporated in their entirety by reference thereto. The typical melt-blowing process comprises continuously extruding a starting polymer in a molten form through orifices of a die nozzle in order to form discrete filaments. The filaments are drawn aerodynamically using a gas stream supplied to an area adjacent to the orifices of the die nozzle, which gas stream attenuates the molten polymer into fibers, preferably microfibers. The continuous filaments are carrier belt or the like to form fibers or a mat of substantially continuous and randomly arranged fibers.

Suitable polyurethane which can be used in the present invention, can be prepared by any of the methods currently employed in the art using the reactants and the proportions set forth above. Preferably the polyurethanes employed in the present invention are made by the one-shot procedure and less preferably by the prepolymer method. These methods are fully described in U.S. Pat. No. 4,376,834, the teachings of which are herein incorporated in their entirety by reference thereto. In the case of the one-shot procedure, the noncellular polyurethanes are made advantageously by preblending the isocyanate-reactive material (b) and the extender (c) and feeding these to the reaction mixture as a single component, the other major component being the polyisocyanate. The mixing of the reactants can be carried out at ambient temperature (i.e. of the order of 20° to 25° C.) and the resulting mixture is then generally heated to a temperature of the order of 40° to 130° C., preferably to a temperature of 50° to 100° C. The reaction components are then admixed and transferred to suitable molds, extruders, flexible belts and the like and allowed to cure at temperatures of the order of ambient temperature to 250° C. Pressure may also be applied during the curing reaction. The time required for curing will vary according to the temperature of curing and also with the nature of the particular composition. The time required in any given case can be determined by a process of trial and error.

Suitable catalysts for catalyzing the reaction of an isocyanate with a reactive hydrogen containing compound, can be employed for preparing the polyurethane used in the present invention. Suitable catalysts are described in, for example, U.S. Pat. No. 4,202,957, the teachings of which are herein incorporated in their entirety by reference thereto. The amount of catalyst employed is generally within the range of 0.02 to 2.0 percent by weight based on the total weight of the reactants.

Suitable organic polyisocyanates (a) useful in making polyurethanes include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5,5'-tetraisocyanate and the diverse polymethylenepolyphenylpolyisocyanates. Other polyisocyanates described in U.S. Pat. No. 4,376,834 can also be used.

The isocyanate-reactive materials (b) employed in the preparation of the polyurethanes used in the present invention can be any of those previously known in the art and employed in the preparation of polyurethanes which materials contain active hydrogen groups and which also meet the criteria set forth above, namely, have a functionality of at least 1.9, a glass transition temperature (Tg) of less than 20° C., and a molecular weight in the range of 500 to 20,000. The materials (b) having these properties or the soft segment derived therefrom can provide thermoplastic characters of the resulting polyurethanes.

Examples of the isocyanate-reactive materials (b) are polyether polyols, polyester polyols, amine-terminated polyethers, hydroxy-terminated polycarbonates, hydroxy-terminated polybutadienes, hydroxy-terminated poly-butadiene-acrylonitrile copolymers, amino-terminated polybutadiene-acrylonitrile copolymers, hydroxy-terminated copolymers of dialkyl siloxane and alkylene oxides such as ethylene oxide, propylene oxide and the like, provided that all of said compounds also meet the criteria of Tg, molecular weight and functionality listed above. Preferably the molecular weights of the materials are within the range of 1,250 to 10,000, and most preferably, in the range of 2,000 to 8,000. The functionality of these materials is advantageously not greater than 6 and preferably, in the range of 2 to 4. Examples of these isocyanate-reactive materials are described more fully in U.S. Pat. No. 4,376,814.

Suitable chain extender (c) which can be used in the present invention include aliphatic straight and branched chain diols, including cycloaliphatic diols, preferably having from 2 to 8 carbon atoms, inclusive, in the chain. Examples of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 1,4-cyclohexanediamethanol, and the like including mixtures of two or more such diols. The extenders, which can be used alone or in admixture with each other or any of the above diols, also include diethylene glycol, dipropylene glycol, tripropylene glycol, ethanolamine, N-methyldiethanol-amine, N-ethyl-diethanolamine, and the like, as well as ester diols obtained by esterifying adipic, azelaic, glutaric and like aliphatic dicarboxylic acids with aliphatic diols such as those exemplified above utilizing from 0.01 to 0.08 mole of acid per mole of diol. Also included in the extenders used in the present invention are the adducts obtained by an aliphatic diol or triol such as 1,4-cyclohexanedimethanol, neopentyl glycol, hexane-1,2--diol, ethylene glycol, butane-1,4-diol, tri--methylolpropane and the like with epsilon-caprolactone in a mole ratio of from 0.01 to 2 moles of caprolactone per mole of diol or triol. Trifunctional extenders such as glycerol, trimethylolpropane and the like can also be employed alone or in admixture with one or more of the above diols. The extenders (c) or the hard segment derived therefrom can provide thermosetting characters of the resulting rigid polyurethanes, resulting in good chemical resistance, excellent toughness and good dimensional stability.

As set forth above, the proportion of the organic polyisocyanate (a), isocyanate-reactive material (b) and the chain extender (c) are such that the reaction product of components (a), (b) and (c) has up to 25 percent by weight, preferably from 0 to about 20 percent by weight, more preferably from 0 to about 10 percent by weight, of soft segment derived from the organic polyisocyanate (a) and the isocyanate-reactive material (c); and at least 75 percent by weight, preferably at least 80 to 98 percent by weight, most preferably at least 90 percent by weight, of hard segment derived from the organic polyisocyanate (a) and the chain extender (c). The use of the ranges outside of the above will result in poor properties in toughness, chemical resistance or dimensional stability. The overall ratio of isocyanate groups to active hydrogen groups in the reactants employed to prepare the polyurethane is preferably in the range of 0.95:1 to 1.05:1.

Highly desirable polyurethanes which can be employed in the present invention suitably have a viscosity ranging from 50 to 1500 poise, more suitably from 100 to 1,000 poise, most suitably from 200 to 500 poise as measured at processing, e.g., extrusion temperature. Preferably the weight average molecular weight of the polyurethane ranges from 50,000 to 750,000, more preferably from 80,000 to 500,000, most preferably from 100 to 300,000 as determined by high temperature size exclusion chromatography. To obtain uniform melt-blown products of better uniformity, a polymer having narrow molecular weight distribution (Mw/Mn) may be selected. The molecular weight distribution of the polyurethane is preferably within the range of from 1.8 to 8.0, more preferably from 2.0 to 5.0, most preferably from 2.5 to 3.5.

Turning now to FIG. 1, there is illustrated one preferred manner of producing microfibers or a nonwoven mat of microfibers. In FIG. 1, a polyurethane, in the form of powders or pellets, is introduced into a hopper, 1, connected to an extruder, 2. The polyurethane is melted in the molten polymer supplying line, 4, by a pump, 5. The term "spinpack" refers to an assembly comprising a die nozzle having at least one orifice for a molten polymer and having at least one gas slot for melt-blowing the molten polymer, and a heating means for keeping the die nozzle at a prescribed, uniform temperature. The extruder 2, the spinpack 3, and the molten polymer supplying line 4 may have a heating means for melting a polymer or for keeping a polymer in a molten state. The heating means is preferably controlled electrically or via a heat transfer fluid system.

A gas stream such as hot air, nitrogen, etc. is introduced into the spinpack, 3, through a gas stream supplying line, 6. In the spinpack, 3, the molten polymer is forced out of an orifice of a nozzle of the spinpack, 3, into the co-current gas stream which attenuates the resin into fibers, 7. The fibers, 7, are collected on a collecting device, 8, in the form of a nonwoven mat. The collecting device may be in the form of a drum or a belt made from a porous material or screening which can collect the microfibers, 7, or the nonwoven mat. The nonwoven may be prepared in a continuous or discontinuous manner and further operations such as compaction, stretching, calendering, embossing, twisting, winding etc. may be performed to further alter or collect the resulting mat. In the practice of the present invention, a plurality of the spinpacks, 3, can be employed. If necessary, i.e., in a case of nozzle blockage, the excess of the molten polymer could be withdrawn from the molten resin supplying line, 4, to an overflow container (not shown).

Figure 2:
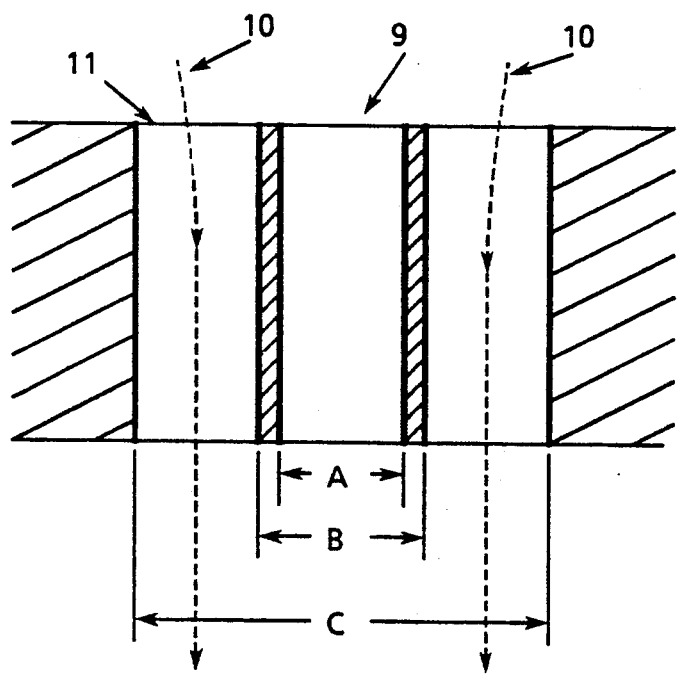
FIG. 2 discloses in cross section the nozzle of the melt-blowing means, (spinpack) which can be used in one embodiment of the melt-blowing process of the present invention.

The mechanism of formation of microfibers is seen more clearly in FIG. 2 which shows an enlarged detail of the cross sectional view of the nozzle of the spinpack, 3. In FIG. 2, the molten polymer is forced out of a circular orifice of a nozzle (die opening), 9, having inner diameter A and outer diameter B, and into the gas stream, 10, which is passed through circular gas slot, 11, having a diameter C. Usually, the spinpack, 3, is provided with a plurality of the orifices, 9. As is apparent from FIG. 2, a polyurethane in a molten form is supplied from the orifice, 9, into the gas stream, 10, supplied to an area adjacent to the orifice, 9, which attenuates the molten polymer into the microfibers, 7.

The characteristics of microfibers or nonwoven mats produced by the melt-blowing process of the present invention will vary depending upon the various process conditions used. Those condition include, for example, gas flow rates; kinds of gas used as a gas stream; properties of a polymer supplied; resin (polymer) flow rates; distance between the collecting device and orifice of a spinpack; the diameter and shape of an orifice; the size of the gas slot; and the temperatures of the polymer, spinpack and gas stream. Of these, the temperature of the polymer and gas supplied, the gas flow rates, the resin flow rate, and the distance between the collecting device and the orifice of the nozzle greatly affect the properties of the final products.

The processing temperature, i.e., temperature of a polymer processed in a molten state, is above 190° C. for a rigid polyurethane prepared from 4,4'-methylene diphenyl diisocyanate, 1,6-hexanediol, cyclohexanedimethanol and polytetramethylene glycol so that the viscosity of the polymer is within the range mentioned above. The processing temperature may finally be controlled by a heating means provided to the spinpack. A preferred temperature range is from about 200° to 280° C., more preferably from 220° to 260° C., most preferably from 230° to 250° C.

In the melt-blowing process of the present invention, the polyurethane in a molten form can be readily attenuated to fibers having diameters of 0.1 to 400 microns. It is also possible to produce fibers having diameters of greater than 400 microns. As gas flow rates increase for a selected resin flow rate of a polymer, the average diameter of the resultant fibers decreases, but the number of fiber breaks may also increase resulting in the formation of short microfibers which are not as suitable for preparing mats having good physical strength, and coarse "shot" which comprises globs or slubs of polymer having a diameter at least several times that of the average diameter size of the fibers. Lower gas velocities result in larger diameter fibers. Preferable gas flow rates (measured at the nozzle) range from 200 to 700 m/sec, more suitably from 400 to 600 m/sec, most suitably from 440 to 560 m/sec. At gas flow rates of from 400 to 600, the fibers are essentially continuous with minimum fiber breaks. Fibers produced in this gas flow rate range have diameters of less than 10 microns, and preferably less than 5 microns.

Suitable gasses used in the present invention include, for example, air, nitrogen, helium, argon and mixtures thereof with air and nitrogen being most common. A preferred gas stream temperature is from 425° to 500° C., more preferably from 440° to 490° C., most preferably from 455° to 475° C.

In the present invention, commercially useful resin flow (throughput) rates can be used. Suitable resin flow rates at each nozzle range from 0.1 to 10, more suitably from 0.5 to 5, most suitably from 1 to 3 grams per minute per orifice.

The resin flow rate, gas flow rate and viscosity of the polymer are controlled and correlated in accordance with the present invention.

The distance of the collecting device from the orifice of the nozzle may be altered to change the physical properties of the resulting mat according to techniques known in the art. In the present process variation in mat physical integrity may be obtained since the self-bonding ability of the fibers decreases with increasing distance from the orifice. At prescribed distances, the fibers have sufficient self-bonding ability to make a high strength web or mat. At longer distances than the above, a final web product in the form of physically entangled but not adhered fibers can be obtained. Suitable distances to obtain the foregoing results will vary dependent on the other factors such as a gas flow rate, resin flow rate, and surrounding temperature. The preferred distance to make nonwoven mats is from 15 to 60 cm, more preferably from 25 to 35 cm.

In accordance with the present invention, the tensile strength of nonwoven mats is increased by fuse-bonding the nonwoven mat by exposing the same to temperatures greater than 270° C., optionally while compressing the mat sufficiently to prevent shrinkage of the fibers in the mat. This type of fuse-bonding process has been previously described for other polymeric fibers in U.S. Pat. No. 3,704,198.

The web or mat of the present invention can be utilized to prepare composites or laminates according to the techniques described in U.S. Pat. Nos. 4,041,203; 4,196,245; and 4,302,495.

As set forth above, the present invention provides microfibers of a rigid polyurethane and nonwoven mats prepared therefrom having good chemical resistance, excellent toughness and good dimensional stability.

The nonwoven mats of the present invention are particularly useful in high temperature filtration of corrosive media such as flue gas (i.e., as bag house filters to remove particulates), acids and hydraulic oil, as coalescing media, and in other applications requiring thermal and chemical stability. The nonwoven mats of the present invention have high insulating value, high cover per unit weight, and high surface area per unit weight. Due to high orientation of microfibers in axial direction, randomization and proper thermal bonding the nonwoven mats also have high strength per unit weight. The nonwoven mats may also be compacted and used as battery separators. The nonwoven mats can also be used in any field where nonwoven mats of conventional construction have been used. Examples include uses as reinforcing liners for linoleum, gasketing, etc.

Having described the invention the following examples are provided as further illustrative and are not to be construed as limiting.

EXAMPLES 1-4

Microfibers or nonwoven mats of melt-blown microfibers were prepared in accordance with a process as shown in FIG. 1 except that excess molten polymer was withdrawn from a molten polymer supplying line, 4, to an overflow container. A ¾" (1.9 cm) extruder (L/D=20; compression ratio=1:3) was used. A spinpack was employed having a nozzle with one orifice surrounded by a circular gas slot, 11, as shown in FIG. 2 wherein the inner diameter of the orifice, A, was 0.0533 cm (0.0210 inches); the outer diameter of the orifice, B, was 0.0826 cm (0.0325 inches); and the diameter of the circular gas slot, C, was 0.1656 cm (0.0652 inches). A distance between the orifice and the collecting device 8 was 3.25 cm. The time required for a polymer to pass through the equipment from the feeding hopper on the extruder to the collecting device below the spinpack was 15 minutes.

A rigid polyurethane (ISOPLAST TM 301 commercially available from The Dow Chemical Company; polyurethane prepared from 4,4'-methylene diphenyldiisocyanate, 1,6-hexane diol, and cyclohexanediol and polytetramethylene glycol) having a weight average molecular weight (Mw) of 300,000 and a molecular weight distribution (Mw/Mn) of 2.5 to 3.0 was added to the extruder hopper and melted. The melt-blowing process was carried out using the process conditions as indicated in Table 1.

In Examples 1 and 3, the final products were obtained in the form of microfibers. In Examples 2 and 4, the final products were obtained in the form of nonwoven mat.

The average diameter, molecular weight and molecular weight distribution of microfibers in the nonwoven mats obtained are as shown in Table 1.

TABLE 1

| Example No. | Gas Stream Temperature at Nozzle (°C.) | Polymer Temperature at Nozzle (°C.) | Polymer Flow Rate at Nozzle (g/min) | Nominal Gas Flow Rate at Nozzle (m/sec)* | Mw (× 1000) | Mw/Mn | Average Diameter of Microfibers (μm) |
|---|---|---|---|---|---|---|---|
| 1 | 282 | 248 | 0.460 | 80.9 | 270 | 2.5-3.0 | or 3.0 |
| 2 | 272 | 248 | 0.460 | 80.9 | 75 | 2.5-3.0 | or 3.0 |
| 3 | 328 | 248 | 0.632 | 448.4 | 250 | 2.5-3.0 | or 3.0 |

TABLE 1-continued

| Example No. | Gas Stream Temperature at Nozzle (°C.) | Polymer Temperature at Nozzle (°C.) | Polymer Flow Rate at Nozzle (g/min) | Nominal Gas Flow Rate at Nozzle (m/sec)* | Mw (× 1000) | Mw/Mn | Average Diameter of Microfibers (μm) |
|---|---|---|---|---|---|---|---|
| 4 | 328 | 248 | 0.632 | 448.4 | 60 | 2.5–3.0 | or 3.0 |

*Nominal Gas Flow Rates were calculated assuming polytropic conditions (neither adiabatic nor isothermal).

What is claimed is:

1. A melt-blowing process for producing a fiber of a polyurethane having a large amount of hard segment, which comprises supplying an extrudable polyurethane comprising the reaction product of:
   (a) an organic polyisocyanate;
   (b) an isocyanate-reactive material having an average functionality of at least 1.9, a glass transition temperature (Tg) of less than 20° C., and a molecular weight in the range of 500 to 20,000; and
   (c) at least one chain extender having a functionality from 2 to 3 and a molecular weight from 50 to 400;
which reaction product has up to 25 percent by weight of soft segment derived from the organic polyisocyanate (a) and the isocyanate-reactive material (b) and at least 75 percent by weight of hard segment derived from the organic polyisocyanate (a) and the chain extender (c), in a molten form from at least one orifice of a nozzle into a gas stream supplied to an area adjacent to the orifice which attenuates the molten polymer into fibers.

2. A process according to claim 1 wherein the polyurethane is supplied at a polymer flow rate at the nozzle of from 0.1 to 10 grams per minute per orifice.

3. A process according to claim 1 wherein the gas stream is supplied at a gas flow rate at the nozzle of from 200 to 700 m/second.

4. A process according to claim 1 wherein temperature of the polymer processed at the nozzle ranges from greater than 270° to 400° C.

5. A process according to claim 1 wherein the temperature of the gas stream ranges from 425° to 500° C.

6. A process according to claim 1 which further comprises collecting the resultant microfibers with a collecting device which is located in the path of the microfibers.

* * * * *